United States Patent [19]
Aonuma et al.

[11] Patent Number: 5,126,215
[45] Date of Patent: Jun. 30, 1992

[54] MAGNETIC RECORDING MEDIUM HAVING A SURFACE WITH PORES OF SPECIFIED AVERAGE INLET DIAMETER AND WIDE PORE SIZE DISTRIBUTION CONTROLLED BY CALENDER TREATMENT

[75] Inventors: Masashi Aonuma; Hiroaki Araki; Hiroshi Hashimoto; Tsutomu Okita; Yasuo Nishikawa, all of Kanagawa, Japan

[73] Assignee: Fuji Photo Film Co., Ltd., Kanagawa, Japan

[21] Appl. No.: 337,686

[22] Filed: Apr. 13, 1989

[30] Foreign Application Priority Data

Apr. 13, 1988 [JP] Japan ................... 63-90862

[51] Int. Cl.⁵ .............................................. G11B 05/00
[52] U.S. Cl. ..................................... 428/694; 428/695; 428/900; 427/130
[58] Field of Search ............... 428/694, 900, 695, 141; 427/130

[56] References Cited

U.S. PATENT DOCUMENTS

| | | | |
|---|---|---|---|
| 4,336,308 | 6/1982 | Yamada et al. | 428/425.9 |
| 4,450,199 | 5/1984 | Tadokoro et al. | 428/317.9 |
| 4,663,209 | 5/1987 | Aonuma et al. | 428/141 |
| 4,678,705 | 7/1987 | Huisman et al. | 428/315.9 |
| 4,759,954 | 7/1988 | Kubota et al. | 427/128 |
| 4,792,483 | 12/1988 | Miyake et al. | 428/323 |
| 4,895,758 | 1/1990 | Sakemoto et al. | 428/323 |
| 4,911,951 | 3/1990 | Ogawa et al. | 427/130 |

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium comprising a nonmagnetic support having formed thereon a magnetic layer containing ferromagnetic particles dispersed in a binder, wherein the surface of the magnetic layer has pores of (a) at most 50 Å in the average value of pore inlet diameters measured by a nitrogen gas adsorption method and (b) at least 25 Å in the half value width of the frequency distribution curve of the pore inlet diameters.

13 Claims, No Drawings

MAGNETIC RECORDING MEDIUM HAVING A SURFACE WITH PORES OF SPECIFIED AVERAGE INLET DIAMETER AND WIDE PORE SIZE DISTRIBUTION CONTROLLED BY CALENDER TREATMENT

FIELD OF THE INVENTION

This invention relates to a magnetic recording medium, and more particularly to a magnetic recording medium having excellent electromagnetic characteristics and running durability at high density recording (short wavelength recording).

BACKGROUND OF THE INVENTION

Recently, magnetic recording media have been widely used as audio tapes, video tapes, and magnetic tapes for computers. In these cases, magnetic recording media are required to have excellent characteristics in electromagnetic conversion characteristics and tape running durability. In particular, excellent electromagnetic characteristics and good running characteristics are very important factors for magnetic recording media and it is necessary to attain the aforesaid two characteristics simultaneously.

For satisfying both the aforesaid required characteristics, a magnetic disc capable of preventing a deviation of output caused by the surface properties of the disc and at the same time improving the durability of the disc by forming pores having an average pore area of from $6 \times 10^{-5}$ to $7 \times 10^{-1}$ $\mu m^2$ (pore diameter of from 86 Å to 9560 Å in the magnetic layer by the random orientation of the magnetic layer has been proposed as disclosed in U.S. Pat. No. 4,759,954.

However, with the demand for high image quality and high tone quality systems such as S-VHS (high quality video) and S-8 mm (compact high quality video) and further with the demand for high quality systems such as High vision (high quality video) and high density type floppy disc, magnetic recording medium for high density recording have been demanded.

For attaining such high density recording, it is necessary to make surface of the magnetic layer super smooth of, for example, less than 5 nm in center line average roughness (Ra). Also, such a super smooth surface of the magnetic layer increases the coefficient of friction thereof, and hence it is further required to improve the running durability of the magnetic tape.

For the aforesaid requirement of high density recording, the above-described average pore area is too large to obtain a sufficient smoothness. Moreover, with a large average pore area the effect of lubricant in the magnetic recording layer does not last due to the large inlet diameter of the pores. That is, since in a conventional magnetic recording medium, the surface of the magnetic layer is not so smooth, the sliding area of the magnetic layer relative to a magnetic head is small and thus there is no serious problem in the sliding characteristics, but since the surface property of the conventional magnetic recording medium is not super smooth, S/N at short wavelength is not improved and hence excellent electromagnetic characteristics are not obtained. Also, since in a conventional magnetic recording medium, the inlet diameters of the pores are relatively large, there is a disadvantage that the lubricant contained in the magnetic layers quickly oozes out and the lubricating effect does not last.

Also, JP-A-62-22239 (the term "JP-A" means an "unexamined published Japanese patent application") discloses that the running stability and the running durability can be improved by incorporating a fatty acid in a magnetic layer of a magnetic recording medium in an amount that the extracting amount of the fatty acid from the surface of the magnetic layer by a nonpolar hydrocarbon solvent is in an amount of from 5 $mg/cm^3$ to 30 $mg/cm^3$ per volume. However, in the case of a magnetic recording medium for high density recording having a super smooth surface, a sufficient tape running property and tape running durability are not obtained even when a so-called free fatty acid exists in the magnetic layer as described above.

SUMMARY OF THE INVENTION

An object of this invention is, therefore, to provide a magnetic recording medium excellent in electromagnetic characteristics for, in particular, high density recording (short wavelength recording) and having improved running stability and running durability.

As the result of various studies for obtaining magnetic recording media having excellent electromagnetic characteristics for, in particular, high density recording and also excellent tape running characteristics, the inventors have discovered that the surface form of the magnetic layer of a magnetic recording medium performs an important role for attaining both the above characteristics and have succeeded in accomplishing the present invention based on this discovery.

That is, according to this invention, there is provided a magnetic recording medium comprising a non-magnetic support having formed thereon a magnetic layer containing ferromagnetic particles dispersed in a binder, wherein the surface of the magnetic layer has pores of (a) at most 50 Å in an average value of pore inlet diameters measured by a nitrogen gas adsorption method and (b) at least 25 Å in the half value width of the frequency distribution curve of the pore inlet diameters.

DETAILED DESCRIPTION OF THE INVENTION

The magnetic recording medium of this invention preferably satisfies the following factors.

(1) The ferromagnetic particles present in the magnetic layer preferably have a specific area by a BET method of at least 35 $m^2/g$ and a crystal size of at most 300 Å.

(2) The surface roughness of the magnetic layer measured by a light interference surface roughness meter is less than about 5 nm in the center surface average roughness (RaI).

(3) In the magnetic layer, the amount of the binder preferably is from 18 to 30 parts by weight per 100 parts by weight of the ferromagnetic particles, and the total amount of all of the other additive(s) which may be present is the same as or less than the amount of the binder.

(4) During the production of the magnetic recording medium, the magnetic layer preferably is subjected to a calender treatment by at least a pair of rigid rolls (e.g., metal roll having a center surface average roughness (RaI) of less about 20 nm).

(5) The glass transition temperature Tg (the peak temperature of E") of the magnetic layer before the calender treatment preferably is at least 30° C., and more preferably at least 50° C. higher than the temperature for the calender treatment.

(6) The binder of the magnetic layer preferably contains a material capable of being crosslinked or polymerized by irradiation.

(7) The magnetic layer is preferably irradiated after the above calender treatment.

In general, it is known that pores exist on the surface of a magnetic layer of a magnetic recording medium and also fine voids exist in the magnetic layer. Hitherto, for improving the electromagnetic characteristics of a magnetic recording medium, it has been attempted to increase the packing ratio or extent of ferromagnetic particles in the magnetic layer and improve the smoothness of the surface of the magnetic layer by decreasing the pores on the surface of the magnetic layer and the voids in the magnetic layer.

However, when the smoothness of the surface of a magnetic layer is greatly increased and the surface thereof becomes super smooth of at most 5 nm in center surface average roughness (RaI), the electromagnetic characteristics, in particular, the output, C/N, etc., of the magnetic recording medium may be improved, but the contact area of the magnetic layer with a recording head, a head cylinder, guide poles, etc., is increased to increase the coefficient of friction, whereby the magnetic recording medium sometimes causes sticking thereto according to the environmental conditions to make running of the tape difficult. Also, in such a case, the tendency of causing sticking of the magnetic recording medium is increased by repeating the running thereof and the tape running stability and running durability are reduced.

Usually, for imparting a lubricating effect to the surface of a magnetic layer of a magnetic recording medium, a lubricant is incorporated in the magnetic layer. However, by increasing the packing extent of ferromagnetic particles in the magnetic layer and increasing the surface smoothness thereof, the amount of a lubricant existing on the surface of the magnetic layer is reduced, and also the transfer and supplying of a lubricant onto the surface of the magnetic layer become insufficient thereby making it difficult to sufficiently use the function of the lubricant, and the running stability and the running durability of the magnetic recording medium are reduced The magnetic recording medium of this invention has excellent electromagnetic characteristics even at high density recording and simultaneously excellent running characteristics such as running stability and running durability owing to the magnetic layer having the specific surface structure.

The magnetic recording medium of this invention has the feature that the surface of the magnetic layer thereof has pores of (a) at most 50 Å in an average value of the pore inlet diameters measured by a nitrogen gas adsorption method and (b) at least 25 Å, preferably 35 Å or more, in the half value width of the frequency distribution curve of the pore inlet diameters as described above. The term "half value width" used herein means difference (Å) in the pore inlet diameter between two points showing a half ($\frac{1}{2}$) of the most frequency in the frequency distribution of the pore inlet diameters.

The measurement of the pores of the surface of the magnetic layer by a nitrogen gas adsorption method is carried out by the following method.

That is, Autosorb-1 (trade name, made by Quantachrome Co., in the Unites States) is used as the measurement device. A magnetic recording tape having ½ inch in width and about 5 meters in length is degassed for longer than 3 hours at normal temperature and at reduced pressure of lower than 250 milli-Torr to provide a test sample, a mixed gas of a helium gas as a carrier gas and a nitrogen gas as an adsorptive gas is used, the partial pressure of the nitrogen gas is gradually increased from 0 to 1, and the adsorption isotherm is measured. Then, the partial pressure of the nitrogen gas is gradually decreased from 1 to 0 and the desorption isotherm is measured. Then, the isotherms of adsorption and desorption thus obtained are analyzed by a BJH method described in E. P. Barrett, L. G. Joyner, and P. P. Halenda, *Journal of American Chemical Society*, 73, 373 (1951) to determine the inside diameters of the pores of the magnetic layer from the adsorption isotherm and to determine the pore inlet diameters and the distribution thereof from the desorption isotherm.

The aforesaid measurement device, Autosorb-1 is a device for automatically measuring the adsorption and desorption isotherms of nitrogen at the liquid nitrogen temperature using a "constant volume method". In addition, at the measurement of the adsorption and desorption isotherms, the increasing and/or decreasing interval of the nitrogen gas partial pressure is set at 0.025. That is, 40 measurement points are set between 0 and 1 in nitrogen gas partial pressure.

In the magnetic recording medium of this invention, the pores of the surface of the magnetic layer have the specific pore inlet diameter and the specific half value width of the frequency distribution curve of the pore inlet diameters as described above, but it is more preferred that the most frequent pore inlet diameter in the distribution curve is less than the average pore inlet diameters. If the pores of the surface of the magnetic layer have values outside the specific values defined in this invention, the running stability and the running durability of the magnetic recording medium are reduced and also the electromagnetic characteristics thereof are reduced. Furthermore, it is preferred that when the surface roughness of the magnetic layer is measured by a light interference surface roughness tester, the center surface average roughness (RaI) of the surface is less than about 5 nm and preferably from 1 to 5 nm.

Also, in the magnetic layer having the super smooth surface as in this invention, the contact area of the layer with a recording head cylinder and guide poles at running is increased, whereby the coefficient of friction is increased and the magnetic recording tape is liable to receive a high load at running. However, by incorporating an ester having a molecular weight of from 400 to 550, preferably from 446 to 536, and being in a liquid state at 25° C. in the pores of the magnetic-layer surface, the magnetic recording medium can keep the lubricating effect at high temperature or at high load. Thus, it is preferred that the magnetic layer of the magnetic recording medium of this invention contains therein such as ester.

As the ester which can be used in the above preferred embodiment of this invention, there are isotridecyl stearate (molecular weight (mw) 466), isocetyl stearate (mw 508), isocetyl isostearate (mw 508), oleyl stearate (A) (mw 534), oleyl isostearate (B) (mw 534), oleyl isostearate (C) (mw 534), oleyl oleate (mw 532), stearyl isostearate (mw 536), isostearyl (C) isostearate (C) (mw 536), isostearyl (B) isostearate (B) (mw 536), stearyl isostearate (A) (mw 536), isostearyl (B) stearate (mw 536), etc.

Herein, isostearic acid (A) is a methyl branch isomer, which is a product mainly obtained by fractionating a by-product at the production of a dimer acid or the derivative of the product thereof and which is mainly comprised of a mixture of the isomers each having a substituted methyl group at one portion of the straight hydrocarbon chain. The substituted position of the methyl group may be optional, but isomers having a methyl group near the center portion of the chain are produced in a greater quantity, and the amount of isomers having a methyl group near the end of the chain are produced in a lesser quantity. Also, isostearic acid (B) and isostearyl (B) can be obtained by an oxo method and are aldehyde derivatives obtained by adding carbon monoxide and hydrogen to a branched unsaturated hydrocarbon such as a low molecular weight polymer of propylene, etc., which are a mixture of isomers having complicated branched structures. Furthermore, isostearic acid (C) and isostearyl (C) are 2-position branched isomers, which are so-called alcohols or dimerized fatty acids synthesized by a Guarbet method and characterized by the group shown in the following formula

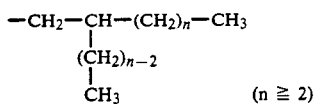

$$-CH_2-CH-(CH_2)_n-CH_3$$
$$\phantom{-CH_2-}|$$
$$\phantom{-CH_2-}(CH_2)_{n-2}$$
$$\phantom{-CH_2-}|$$
$$\phantom{-CH_2-}CH_3 \qquad (n \geq 2)$$

The above ester preferably is used in an amount of from 0.5 to 25 parts by weight, more preferably from 1 to 20 parts by weight, per 100 parts by weight of the binder in the magnetic layer. Also, the above esters may be used singly or as a mixture thereof.

For incorporating the lubricant (ester) in the magnetic layer, the lubricant may be added to the coating composition for forming the magnetic layer or a solution of the lubricant may be coated on the magnetic layer. Then, after drying the magnetic layer containing the lubricant, a calender treatment or a heat treatment may be applied to the magnetic recording medium to bring about sufficient permeation of the lubricant in the magnetic layer.

The ester exists in the pores of the magnetic layer surface and in the fine voids in the layer to function effectively and hence the effect of the lubricant is very large.

Furthermore, in another preferred embodiment of this invention, the magnetic layer in this invention contains a fatty acid in the pores of the surface thereof in such an amount that the extracting amount of the fatty acid from the surface of the magnetic layer by normal hexane is from 5 to 15 mg/m² per area of the magnetic layer surface, whereby the running stability and the running durability of the magnetic recording medium can be improved.

In the magnetic layer of this invention having pores and a distribution thereof as defined above, when a so-called free fatty acid which is extracted by a nonpolar hydrocarbon solvent as described in JP-A-62-22239 exists in the inside of the magnetic layer, the fatty acid can not effectively contribute as a lubricant. The free fatty acid existing near the surface of the magnetic layer contributes effectively. The free fatty acid is preferably contained in the pores of the surface of the magnetic layer.

Also, according to studies by the inventors, it has been confirmed that in regard to the amount of a free fatty acid, the existing amount thereof per unit area of the magnetic layer has a relation with the running stability and the running durability of the magnetic recording tape, and the existing amount of a free fatty acid per unit volume of the magnetic layer can not clarify the above relation since the thickness of the magnetic layer differs.

The existing amount of a free fatty acid in the magnetic layer to the coated amount of the fatty acid depends upon the kinds and the compounding ratio of the binder and various additives (e.g., abrasives, carbon black, etc.) co-existing in the magnetic layer, but in the magnetic recording medium of this invention having the super smooth magnetic layer surface, the addition period or time of adding the fatty acid to the coating composition for the magnetic layer is particularly important. That is, ferromagnetic particles and various additives are sufficiently dispersed in a binder (preferably having a polar group) to adsorb the binder onto the ferromagnetic particles and the additives and after adding thereto a fatty acid, the coating composition for the magnetic layer is coated on a support soon.

It has also been found that when a free fatty acid is added at the beginning of dispersing the ferromagnetic particles with a binder, etc., the addition amount of the free fatty acid must be increased for attaining the free acid near the surface of the magnetic layer in the range defined in this invention. However, the increased amount of the free fatty acid results in undesirably deteriorating the properties of the magnetic layer. This phenomenon becomes more remarkable as the surface of the magnetic layer becomes smoother.

If the amount of a free fatty acid is less than about 5 mg/m², the running stability is not improved and, in particular, the occurrence of contact noise at running of the magnetic recording tape is increased. Also, if the amount of the fatty acid is above about 15 mg/m², the improvement of the running durability is almost saturated and further improvement is not obtained. Further, the existence of such a large amount of fatty acid gives a bad influence on the running stability and causes undesirable blooming, etc.

The extracting amount of a fatty acid from the surface of the magnetic layer by n-hexane in this invention is obtained by the following manner.

That is, four sample magnetic recording tapes ½ inch in width and 1 meter in length and having a magnetic layer containing a fatty acid were prepared (if fatty acid is attached to the back surface of the magnetic tape, the fatty acid is first removed before conducting the test). In a 300 ml glass beaker is placed 200 ml of distilled n-hexane, and then the four sample tapes are placed in the beaker without piling or stacking the tapes on each other. The tapes then are stirred for 30 minutes at 60° C. to extract the fatty acid in the magnetic layer with the n-hexane.

After cooling, n-hexane is transferred to a one liter egg-plant type flask.

Then, 200 ml of n-hexane is placed in the 300 ml glass beaker (the four sample tapes again are sufficiently immersed in n-hexane) and the remaining fatty acid in the magnetic layers is extracted similarly for 30 minutes at 60° C. This operation thus is performed twice and 400 ml of n-hexane is transferred into the one liter egg-plant type flask.

Then, the n-hexane in the egg-plant type flask is distilled off and from the residue, the extracted amount of the fatty acid is determined by gas chromatography.

The fatty acid which can be used in this embodiment of the invention preferably has from 9 to 22 carbon atoms and more preferably from 12 to 18 carbon atoms. Examples of the fatty acid include straight chain saturated fatty acids such as decanoic acid, dodecanoic acid (lauric acid), tetradecanoic acid (myristic acid), hexadecanoic acid (palmitic acid), octadecanoic acid (stearic acid), eicosanoic acid (arachic acid), docosanoic acid (behenic acid), tetracosanoic acid, pentadecanoic acid, heptadecanoic acid, etc.; straight chain unsaturated fatty acids, such as, decenoic acid, dodecenoic acid, tetradecenoic acid, hexadecenoic acid, octadecenoic acid (e.g., oleic acid and elaidic acid), eicosenoic acid, docosenoic acid, octadecadienoic acid (e.g., linolic acid, etc.), octadecatrienoic acid (e.g., linolenic acid, etc.), etc.; and branched saturated fatty acids such as isooctadecanoic acid, isohexadecanoic acid, isotetradecanoic acid, isotridecanoic acid, etc.

(The position of the branch of the branch of the branched fatty acid differs according to the synthesis method. For example, the branched fatty acid obtained by rectifying the by-product in the synthesis of dimer acid is a so-called "methyl branch type" and the branched fatty acid obtained by a Guerbet reaction is a "2-position branched type". Also, fatty acids synthesized by an oxo method are a mixture of isomers having complicated branched structures.)

The above fatty acids can be used singly or as a mixture thereof.

The amount of the fatty acid which can be added to the magnetic coating composition may be properly selected such that the amount is in the extracting range defined in this invention.

The magnetic recording medium of this invention fundamentally comprises a non-magnetic support having formed thereon a magnetic layer containing ferromagnetic particles dispersed in a binder.

First, as a non-magnetic support for the magnetic recording medium of this invention, any support which is ordinarily used for conventional magnetic recording media can be used without any particular restriction. For example, there are films or sheets of plastics such as polyester resins (e.g., polyethylene terephthalate and polyethylene-2,6-naphthalate), polyolefin resins (e.g., polypropylene), cellulose derivatives (e.g., diacetyl cellulose and triacetyl cellulose), vinyl chloride resins (e.g., polyvinyl chloride), polysulfone resins, polycarbonate resins, polyimide resins, polyamide resins, polyamido-imide resins, etc.; sheets or foils of metals such as aluminum, stainless steel, copper, etc.; and sheets of various ceramics.

To such a support may be applied a pre-treatment such as a corona discharging treatment, a subbing treatment, a heat treatment, a metal vapor-deposition treatment, an alkali treatment, etc. These supports may be previously cut into a necessary size or may be cut into a necessary size after forming the magnetic layer and a back layer described below. The thickness of the support is preferably from about 2.5 μm to 100 μm, and more preferably from about 3 μm to 80 μm in the case of film or sheet, and is preferably from about 30 μm to 10 mm in the case of disc or card. The form of the support can be cylindrical in the case of a drum support. The form can be determined according to the kind of a recorder being employed.

Also, the surface roughness (Ra) (measured by a needle-contact type surface roughness tester: cutoff value 0.25 mm) of the above support generally is less than 0.05 μm, preferably less than 0.02 μm, and more preferably from 0.015 to 0.004 μm. In particular, when the surface roughness (Ra) is less than 0.02 μm, excellent effects are obtained.

As the material for the ferromagnetic particles which can be used in this invention, materials which are used for magnetic layers of ordinary magnetic recording media can be used. Examples thereof are iron-base ferromagnetic metals such as $\gamma$-Fe$_2$O$_3$, Fe$_3$O$_4$, weakly reduced $\gamma$-Fe$_2$O$_3$ (a mixed crystal of $\gamma$-Fe$_2$O$_3$ and Fe$_3$O$_4$), etc.; Co-doped type ferromagnetic iron oxides obtained by applying a Co compound onto the surfaces of the aforesaid ferromagnetic iron oxides; chromium dioxide; and hexagonal system ferrite series ferromagnetic substances such as barium ferrite and strontium ferrite.

The $\gamma$-Fe$_2$O$_3$ or weakly reduced $\gamma$-Fe$_2$O$_3$ can be produced by various method, but ferromagnetic $\gamma$-Fe$_2$O$_3$ is having acicular crystals or weakly reduced $\gamma$-Fe$_2$O$_3$ is generally produced by reducing goethite or lepidocrosite of hydrated iron oxide as a starting material to form magnetite and then further oxidizing the magnetite.

Also, the Co-doped ferromagnetic iron oxide can be obtained by suspending the particles of $\gamma$-Fe$_2$O$_3$ obtained as described above in water, adding a Co compound such as cobalt chloride and an alkali such as sodium hydroxide to the suspension to apply the Co compound onto the surfaces of the $\gamma$-Fe$_2$O$_3$ particles, taking out the particles from the suspension, and, if necessary, heat-treating the particles at a relatively low temperature of about 120° C.

The ferromagnetic metal particles generally are alloy particles wherein at least 75% by weight of the particles is a metal component, at least 80% by weight of the metal component is at least one ferromagnetic metal or alloy (e.g., Fe, Co, Ni, Fe—Co, Fe—Ni, Co—Ni, Co—Ni—Fe, etc.), and the particles may contain other components (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, B, La, Ce, Pr, Nd, Bi, P, etc.) in the range of less than 20% by weight of the metal component.

Also, the above ferromagnetic metal component may contain a small amount of water, a hydroxide, or an oxide.

The production process for these ferromagnetic metal fine particles is known, and such a known process can be utillized for producing the ferromagnetic metal fine particles being used in this invention.

It is preferred that the specific area ($S_{BET}$) of the ferromagnetic particles measured by a BET method is at least 35 m$^2$/g, and preferably at least 45 m$^2$/g and the crystal particle sizes thereof are less than about 300 Å. As the particle sizes become finer, the pore diameter of the surface of the magnetic layer can be more easily reduced and the packing degree of the ferromagnetic particles can be increased.

Ferromagnetic particles having $S_{BET}$ of at least 35 m$^2$/g can be produced by selecting the particle size and $S_{BET}$ of starting materials.

Also, as the form of the ferromagnetic particles, there are various embodiments, such as acicular, granular, dice-like, and tabular forms.

As a binder for uniformly dispersing the ferromagnetic particles and forming the magnetic layer having a uniform thickness on a support, there are thermoplastic resins, thermosetting resins, radiation-hardenable resins, reactive resins, and a mixture thereof. A binder containing a material which can be crosslinked or polymerized by the action of radiations is more preferably used in this invention.

The aforesaid thermoplastic resins preferably have a softening point of not higher than 150° C., an average molecular weight of form 10,000 to 300,000, preferably from 10,000 to 20,000, and a polymerization degree of from about 1,000 to 2,000. Examples of thermoplastic resins which can be used are acrylic acid ester copolymers (e.g., an acylic acid esteracrylonitrile copolymer, an acrylic acid ester-vinylidene chloride copolymer, acrylic acid ester-styrene copolymer, and chlorovinyl ether-acrylic acid ester copolymer), methacrylic acid ester copolymers (e.g., a methacrylic acid ester-acrylonitrile copolymer, a methacrylic acid ester-vinylidene chloride copolymer, and a methacrylic acid ester-styrene copolymer), a vinylidene chloride-acrylonitrile copolymer, polyvinyl chloride resins, vinyl chloride copolymers, polyurethane resins, urethane elastomers, nylon-silicone resins, cellulose derivatives (e.g., nitrocellulose, diacetyl cellulose, triacetyl cellulose, cellulose propionate, and cellulose acetate butyrate), nitrocellulose-polyamide resins, polyamide resins, polyester resins, polyvinyl fluoride, polyvinyl butyral, a styrenebutadiene copolymer, a butadiene-acrylonitrile copolymer, phenol resins, epoxy resins, urea resins, melamine resins, polyester resins, amino resins, and various kinds of synthetic rubbers.

The vinyl chloride copolymers resins, which can be used in this invention preferably have a softening point of lower than about 150° C. and average molecular weight of from about 10,000 to 300,000.

Specific examples of the preferred vinyl chloride copolymers are a vinyl chloride-vinyl acetate copolymer, a vinyl chloride-vinyl acetate-maleic acid copolymer, a vinyl chloride-vinyl acetate-vinyl alcohol copolymer, a vinyl chloride-vinyl acetate, maleic acid-vinyl alcohol copolymer, a vinyl chloride-vinyl propionate-maleic acid copolymer, a vinyl chloride-vinyl propionate-vinyl alcohol copolymer, a vinyl chloride-vinyl acetate-acrylic acid copolymer, a vinyl chloride-vinyl acetate-acrylic acid-vinyl alcohol copolymer, and the oxidation products of these copolymers.

In particular, vinyl chloride copolymers having a carboxylic acid group or a salt thereof, a sulfonic acid group or a salt thereof, a phosphoric acid or a salt thereof, or a polar group such as an amino group, a hydroxy group, etc., are preferred for improving the dispersibility of the ferromagnetic particles.

Also, as the polyurethane resins, polyurethane produced from polyol, polyisocyanate, and, if necessary, a chain elongating agent by a conventional method for producing polyurethane.

Examples of the polyol are polyether polyol, polyester polyol, polycarbonate polyol, and polycaprolactone polyol.

Specific examples of the polyether polyol are polyalkylene glycols such as polyethylene glycol, polypropylene glycol, etc.

The polyester polyol can be synthesized by a polycondensation of a dihydric alcohol and a dibasic acid or an open chain polymerization of a lactone such as caprolactone. Typical examples of dihydric alcohol are glycols such as ethylene glycol, propylene glycol, butanediol, 1,6-hexanediol, cyclohexane dimethanol, etc. Also, specific examples of dibasic acid are adipic acid, pimelic acid, azelaic acid, sebacic acid, phthalic acid, terephthalic acid, etc.

Also, the polycarbonate polyol preferably is a polycarbonate polyol having a molecular weight of from 300 to 20,000 and a hydroxy group value of from 20 to 300 synthesized by a condensation or an ester exchange of a polyhydric alcohol shown by the formula (I)

$$HO-R^1-OH \quad (I)$$

wherein $R^1$ represents $-(CH_2)_n-$ (wherein n represents an integer of from 3 to 14),

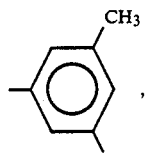

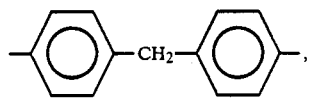

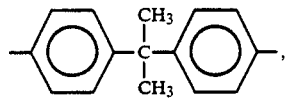

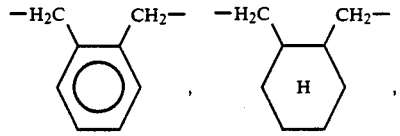

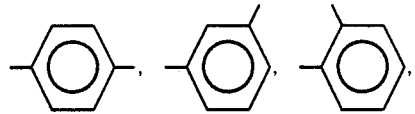

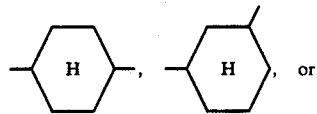

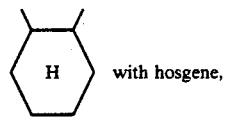

with hosgene, a chloroformic acid ester, a dialkyl carbonate, or a diaryl carbonate. The polycarbonate polyol can also be a polycarbonate polyester polyol having a molecular weight of from 400 to 30,000 and a hydroxy group value of from 5 to 300 obtained by a condensation of the above polycarbonate polyol and a dicarboxylic acid shown by the formula (II)

$$HOOC—R^2—COOH \quad (II)$$

wherein $R^2$ represents an alkylene group having from 3 to 6 carbon atoms, a 1,4-phenylene group, a 1,3-phenylene group, a 1,2-phenylene group, a 1,4-cyclohexylene group, a 1,3-cyclohexylene group, or a 1,2-cyclohexylene group.

The polycarbonate polyol may be compounded with other polyols such as a polyethyl polyol, a polyester ether polyol, polyester, etc., in an amount of up to 90% by weight of the polycarbonate polyol.

There is no particular restriction on the polyisocyanate which is used to form polyurethane by reacting with the above polyols. Examples of the polyisocyanate are hexamethylene diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4-diphenylemthane diisocyanate, 3,3-dimethylphenylene diisocyanate, and dicyclohexylmethane diisocyanate.

Also, examples of the chain elongating agent are the above polyhydric alcohols, aliphatic polyamines, alicyclic polyamines, and aromatic polyamines.

The above polyurethanes may have a polar group such as —COOM, —SO$_3$M, —OPO$_3$M, or —OM (wherein M represents a hydrogen atom, sodium or potassium).

The thermosetting resin or reactive resin which can be used as a binder preferably has a molecular weight of less than 200,000 in the state of a coating composition, but the molecular weight thereof becomes very large by heating after coating and drying the coated layer. Examples of these resins are phenol resins, phenoxy resins, epoxy resins, polyurethane setting resins, urea resins, melamine resins, alkyd resins, silicone resins, acrylic reactive resins, epoxypolyamide resins, nitrocellulose-melamine resins, a mixture of a high molecular weight polyester resin and an isocyanate prepolymer, a mixture of a methacrylate copolymer and a diisocyanate prepolymer, a mixture of a polyester polyol and polyisocyanate, urea formaldehyde resins, a mixture of a low molecular weight glycol, a high molecular weight diol, and triphenylmethane triisocyanate, polyamine resins, and mixtures of them.

Furthermore, the radiation hardenable resins which can be used as a binder are resins having at least one carbon-carbon unsaturated bond capable of being hardened by irradiation of the molecule. The radiation-hardenable reins can be obtained by incorporating a compound having at least one carbon-carbon unsaturated bond in the molecule into the above vinyl chloride copolymers or polyurethane resins by using the compound as the copolymerization component at the copolymerization of the above copolymers or by reacting the compound and the above copolymers or resins.

As the compound having at least one carbon-carbon unsaturated bond in the molecule, a compound having at least one acryloyl or methacryloyl group (hereafter collectively referred to as "(meth)acryloyl") in the molecule is preferred and the compound may further have a glycidyl group or a hydroxy group.

Moreover, a compound capable of being polymerized by irradiation may be added to the binder. Examples of such a compound are (meth)acrylic acid esters, (meth)acrylamides, allyl compounds, vinyl ethers, vinyl esters, vinyl heterocyclic compounds, N-vinyl compounds, styrenes, (meth)acrylic acid, crotonic acids, itaconic acids, and olefins.

In these compounds, a compound having two or more (meth)acryloyl groups in one molecule is particularly preferred and examples of such a compound are diethylene glycol (meth)acrylate, triethylene glycol (meth)acrylate, trimethylolpropane tri(meth)acrylate, pentaerythritol tetra(meth)acrylate, and a reaction product of polyisocyanate and poly(meth)acrylate.

Also, the binder may further contain a compound (polyisocyanate) having two or more isocyanate groups. As such a polyisocyanate, there are isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, triphenylmethane triisocyanate, etc.; reaction products of these isocyanates and polyalcohols; and polyisocyanates formed by the condensation of these isocyanates.

The above polyisocyanates are commercially available under trade names of Coronate L, Coronate HL, Coronate H, Coronate EH, Coronate 2030, Coronate 2031, Coronate 2036, Coronate 3014, Coronate 2015, Coronate 3015, Coronate 3041, Coronate 2014, Millionate MR, Millionate MTL, Dultosec 1350, Dultosec 2170, and Dultosec 2280 (trade names, made by Nippon Polyurethane Kogyo K. K.), Takenate D-102, Takenate D-110N, Takenate D-200, and Takenate D-202 (trade name, made by Takeda Chemical Industries, Ltd.), Sumidur N75 (trade name, made by Sumitomo Bayer Co.), Desmodur L, Desmodur IL, Desmodur N, and Desmodur HL (trade names made by Bayer A. G.), and Burnock D850 and Burnock D802 (trade names, made by Dainippon Ink and Chemicals, Inc.).

These polyisocyanates can be used singly or as a combination of two or more by utilizing the difference in the hardening reactivities.

Also, for accelerating hardening, it is preferred to use the polyisocyanate with a compound having many functional groups such as hydroxy group and amino group.

It is preferred that the compounding ratio of the ferromagnetic particles and the binder in the magnetic layer of the magnetic recording medium of this invention is from 18 to 30 parts by weight for the binder per 100 parts by weight of the ferromagnetic particles. By employing the above compounding ratio, the size of the pores of the magnetic layer is reduced and the packing degree of the ferromagnetic particles is increased. If the compounding ratio is less than 18 parts by weight, the magnetic layer is liable to be cracked.

The magnetic layer of the magnetic recording medium of this invention may further contain various additives such as carbon black, fillers, abrasives, dispersing agents, antistatic agents, lubricants, etc., in addition to the ferromagnetic particles, the binder, and, if necessary, the ester or the fatty acid. The amount of these additives is preferably the same as or less than the amount of the binder.

As the carbon black, known carbon blacks such as furnace black, color black, acetylene black, etc., can be optionally used. Also, carbon black in which a part of the surface of the carbon black has been grafted can be used.

In this invention, it is preferred to use carbon black the average particle size of which is from about 30 mμ to 1000 mμ. Also, a mixture of fine particle carbon black and coarse particle carbon black can be used.

In regard to the fillers, there is no particular restriction on the filler being used in this invention and ordinary fillers having an average particle size of from 0.01 μm to 0.8 μm, and preferably from 0.06 μm to 0.4 μm can be used. Examples of filler which can be used are the particles of tungsten disulfide, calcium carbonate, titanium dioxide, magnesium oxide, zinc oxide, calcium oxide, and lithopone. They can be used singly or as a mixture thereof.

As abrasives which can be used in the magnetic layer of this invention, there can be mentioned α-alumina, fused alumina, silicon carbonate, chromium oxide, cerium oxide, corundom, aritificial diamond, α-iron oxide, garnet, emery (mainly comprised of corundom and magnetite), garnet, silica, silicon nitride, boron nitride, molybdenum carbide, boron carbide, tungsten carbide, titanium carbide, tripoli, diatomaceous earth, and dolomite. These fillers can be used for improving the durability of the magnetic layer of the magnetic recording medium.

In particular, it is preferred to use one to four of the above kinds of abrasives, and especially those having a Mohs' hardness of at least 6. Also, it is preferred that the average particle size of the abrasive is from 0.005 to 5 μm, and particularly from 0.05 to 2 μm.

The abrasive is preferably used in an amount of from 0.05 to 20 parts by weight per 100 parts by weight of the binder, and more preferably from 1 to 20 parts by weight per 100 parts by weight of the ferromagnetic particles.

In this invention, lubricants other than the esters and fatty acids of this invention can also be used, such as silicone oils, graphite, carbon black, Teflon, molybdenum disulfide, boron nitride, fluorinated graphite, tungsten disulfide, fluorinated alcohols, polyolefins, polyglycols, alkylphosphoric acid esters, polyphenyl ethers, higher alcohols, higher fatty acid amides, higher fatty acid alcohols, mineral oils, animal and vegetable oils, olefin low polymers, etc.

Furthermore, additives which are usually used with lubricants, such as antioxidants (e.g., alkylphenols), rust preventive agents (e.g., naphthenic acid), oiliness improvers (e.g., lauryl alcohol), high-pressure lubricants (e.g., dibenzyl sulfide), cleaning dispersants, viscosity index improving agents, pour point depressants, defoaming agents, etc., may be added to the lubricants.

The lubricant preferably is used in an amount of from 0.05 to 20 parts by weight per 100 parts by weight of the, binder.

As an antistatic agent which can be used in this invention, there are electroconductive powders of graphite, various kinds of carbon blacks, carbon black graft polymers, tin oxide-antimony oxide compounds, titanium oxide-tin oxide-antimony oxide compounds, etc.; natural surface active agents such as saponin, etc.; nonionic surface active agents such as alkylene oxides, glycerins, glycidols, polyhydric alcohols and polyhydric alcohol esters; cationic surface active agents such as higher alkylamines, cyclic amines, hydantoin derivatives, amides, amines, ester amides, quaternary ammonium salts, pyridine and other heterocyclic compounds, phosphoniums, sulfoniums, etc.; anionic surface active agents having an acid group such as a carboxylic acid group, a sulfonic acid group, a phosphoric acid group, a sulfuric acid ester group, etc.; and amphoteric surface active agents such as amino acids, aminosulfonic acids, sulfuric acid esters o phosphoric acid esters of aminoalcohols alkylbetaine type surface active agents, etc.

They can be used singly or as a combination thereof.

The antistatic agents also have the ability of improving the dispersibility, improving the magnetic characteristics, improving the lubricating property, improving the coating property, etc., in addition to its function as an antistatic agent.

When an electro conductive powder is used as the antistatic agent, it is preferably used in an amount of from about 0.2 to 20 parts by weight per 100 parts of the binder and when a surface active agent is used as the antistatic agent, it is preferably used in an amount of from about 0.1 to 10 parts by weight per 100 parts by weight of the binder.

As a dispersing agent which can be used in this invention, there are metal soaps of fatty acids having from 10 to 22 carbon atoms (e.g., caprylic acid, capric acid, lauric acid, myristic acid, palmitic acid, stearic acid, oleic acid, elaidic acid, linolic acid, linolenic acid, stearolic acid, etc.) with an alkali metal, an alkaline earth metal, copper, lead, etc.; compounds obtained by substituting a part or the whole of the hydrogens of esters of these fatty acids, with fluorine atom; amides of the above fatty acids; aliphatic amines, polyalkylene oxide, alkylphosphoric acid esters, alkylboric acid esters, sarcosinates, alkyl ether esters, trialkyl polyolefinoxy quaternary ammonium salts, lecithin, higher alcohols, sulfuric acid esters and phosphoric acid esters of the above alcohols, amine compounds, alkylsulfates, polyethylene oxide, sulfosuccinic acid, sulfosuccinic acid esters, etc.

The dispersing agents may be used singly or as a combination of them. Also, the dispersing agent can be used preferably in an amount of from about 0.01 to 20 parts by weight per 100 parts by weight of the binder, or preferably from about 1 to 20 parts by weight per 100 parts by weight of the ferromagnetic particles.

The above additives such as the dispersing agents, the antistatic agents, etc., have, strictly speaking, other effects in addition to the above effects. For example, the dispersing agent may function as a lubricant and antistatic agent. Accordingly, the effect of the compound classified as above is not limited to the aforesaid effect only, and in the case of using an additive having plural effects, the addition amount thereof is preferably determined by considering the various effects of the additive.

The magnetic layers in this invention may further contain other additives such as cleaning dispersing agents, viscosity index improving agents, or point depressants, defoaming agents, etc.

The coating composition for the magnetic layer is fundamentally prepared by dissolving a desired binder in a solvent capable of dissolving the binder, adding ferromagnetic particles and necessary additives to the solution, and stirring the mixture to provide a uniform dispersion.

As the solvent for preparing the coating composition, conventional, well known solvents can be used. Examples of solvents which can be used include ketone solvents such as acetone, methyl ethyl ketone, methyl isobutyl ketone, cyclohexanone, isophorone, etc.; alcohol solvents such as methanol, ethanol, propanol, butanol, isopropyl alcohol, isobutyl alcohol, methyl hexanol, etc.; ester solvents such as methyl acetate, ethyl acetate, butyl acetate, isobutyl acetate, isopropyl acetate, ethyl butyrate, ethyl lactate, ethylene glycol monoacetate, etc.; ether solvents such as glycol acetate monoethyl ether, ethylene glycol dimethyl ether, diethylene glycol monoethyl ether, tetrahydrofuran, dioxane, etc.; aromatic hydrocarbon solvents such as benzene, toluene, xylene cresol, styrene, etc.; halogenated hydrocarbon solvents such as methylene chloride, ethylene chloride, carbon tetrachloride, chloroform, dichlorobenzene, etc.; N,N-dimethylformamide, etc.

These solvents can be selected according to the kind of the binder being used and they may be used singly or as a combination thereof.

The organic solvents preferably are selected such that the solvent can completely dissolve the components being dissolved and in the case of a mixed solvent, the selection of each solvent and their mixing ratio can be easily determined by routine experimentation. Furthermore, these solvents must not deteriorate the characteristics of the ferromagnetic particles which are the main component for the magnetic layer.

The various components for the magnetic coating composition can be dissolved or dispersed in the organic solvent by using a two roll mill, three roll mill, bail mill, pebble mill, trommel, sand grinder, attritor, high speed impeller, dispersing means, high speed stone mill, high speed impact mill, dispa, kneader, high speed mixer, ribbon blender, co-kneader, intensive mixer, tumbler, blender, disperser, homogenizer, super sonic dispersing means, etc.

The viscosity of the coating composition thus prepared is usually from 60 to 200 ps.

The magnetic coating composition for a magnetic layer thus dispersed can be coated on a support by, for example, an air doctor coating method, a blade coating method, a rod coating method, an extrusion coating method, an air knife coating method, a squeeze coating method, a dip coating method, a reverse roll coating method, a transfer roll coating method, a gravure coating method, a cast coating method, a kiss coating method, or a spray coating method.

The coating amount of the magnetic coating composition is preferably that amount which produces a coated film having a dry thickness of from 2 to 10 $\mu$m.

The magnetic coating composition may be directly coated on the non-magnetic support, but can be coated thereon after applying a surface treatment, such as a corona discharging treatment or an electron ray irradiation treatment onto the surface of the non-magnetic support, or after forming a subbing layer or adhesive layer on the surface of the non-magnetic support.

The coated layer formed on the support is usually subjected to a magnetic field orientation treatment during drying to orient the ferromagnetic particles in the magnetic layer, and then is dried by heating the magnetic layer at a temperature of from 50° C. to 120° C. for 10 seconds to 5 minutes.

These techniques for coating, magnetic field orienta-treatment, drying, etc., of the magnetic coating composition for forming the magnetic layer are well known and they can be properly utilized for this invention.

When the coated element prepared as described above is in the form of a tape (magnetic tape) using, for example, a plastic film as the support, it is preferred that the element has a back layer of the proper composition on the back surface. As the components for the coating composition of the back layer, there may be mentioned the binder, the organic solvent, and the inorganic lubricants described above as components of te magnetic coating composition for magnetic layer. These components can be properly selected for use in the back layer.

The inorganic lubricant for the back layer preferably is a fine powder having an average particle size of less than 0.8 $\mu$m, and preferably less than 0.4 $\mu$m. The mixing ratio of the binder to the inorganic lubricant in the back layer preferably is from 1:0.1 to 1:4 by weight ratio.

Also, as in the case of forming the magnetic coating composition for a magnetic layer, a fine powder of an inorganic material as a lubricant can be uniformly dispersed in an organic solvent solution of a binder to provide the coating composition for back layer. The coating composition can be coated on the back surface of the support after or before forming the magnetic layer and dried to form a back layer.

In addition, the coated layer(s) of a magnetic recording medium preferably are as thin as possible for increasing the recording density per unit of the magnetic recording medium, and hence the thickness of the back layer is preferably from about 0.3 $\mu$m to 1.5 $\mu$m, and more preferably thinner than about 0.6 $\mu$m.

The preparation, coating, drying, etc., of the coating composition for the back layer are almost the same as the case of forming the magnetic layer.

In addition, it is a matter of choice whether the back layer is formed before forming the magnetic layer or after coating the magnetic layer.

After drying the magnetic layer and the back layer, the magnetic layer is usually subjected to a surface smoothening treatment by a calender treatment. It is preferred that the calender treatment is carried out using at least a pair (2 stages) of rigid rolls, and preferably 3 or more stage rigid rolls and includes the steps of heating and pressing. (As used herein, the term "stage" refers to a single roll.) As the aforesaid rigid rolls, there are, for example, metal rolls having a center surface average roughness (RaI) of less than about 20 nm, and preferably less than about 10 nm.

In the calender treatment by a pair of rigid rolls, the magnetic layer is brought into contact with the roll in line contact, whereby the pressure per unit area is high and thus the surface is more smoothened and the inlet diameters of the pores of the magnetic layer can be reduced. On the other hand, in an ordinary calender treatment by an ordinary elastic roll and a metal roll, the contact of the magnetic layer is area contact and hence the pressure per unit area is not increased although they may apply a rubbing effect.

Examples of the rigid rolls are various steel rolls, the surfaces of which are applied with a chromium plating or ceramic coating, and steel rolls the surfaces of which are made of a super hard alloy.

Before and/or after using at least a pair of rigid rolls, a step of using a combination of a rigid roll and an elastic roll, which are used for an ordinary calender treatment, may be employed.

The above calender treatment using at least a pair of rigid rolls is preferably carried out at a temperature of from 50° C. to 110° C. and a line pressure of from 50 to 350 kg/cm in this invention. If the conditions for the calender treatment are outside the above range, a magnetic recording medium having desired characteristics is not obtained. That is, if the treatment conditions are lower than the above ranges, a magnetic recording medium having excellent electromagnetic characteristics and running characteristics can not be obtained, and also if the above treatment conditions are higher than the above ranges, the magnetic recording medium is deformed or the rigid rolls are damaged during the treatment.

In the case of subjecting the magnetic layer to the calender treatment in this invention at the production of the magnetic recording medium of this invention, it is preferred that the glass transition temperature Tg of the magnetic layer (the peak temperature of E'', i.e., the temperature at which an absorption peak is seen in loss elastic modulus of the magnetic layer) before the treatment is kept at a value of at least 30° C., and more preferably at least 50° C. lower than the temperature of the calender treatment. This is because the magnetic layer is liable to become fluidized and is liable to be deformed. Thus, the packing degree of the ferromagnetic particles is liable to increase and as the result thereof, a magnetic layer having pores of smaller inlet diameters is obtained.

In general, the glass transition point Tg of the magnetic layer before the calender treatment is preferably lower than about 60° C., and particularly lower than about 40° C. The glass transition temperature Tg can be kept at the above condition by properly selecting the kind and the amount of the binder or controlling the amount of the solvent remaining in the magnetic layer. In particular, the glass transition point Tg can be easily controlled by using as the binder a material capable of being crosslinked or polymerized by irradiation.

After applying the smoothening treatment to the surface of the magnetic layer as described above, a radiation irradiation treatment or a heat treatment is properly applied thereto. As the radiation for the irradiation treatment, electron rays, $\gamma$ rays, $\beta$ rays, ultraviolet rays, etc., can be used, but electron rays are preferably used. The irradiation of electron rays preferably is carried out by using an electron ray accelerator. By the irradiation of electron rays, the binder component of the magnetic layer coated on the non-magnetizable support is hardened by causing a polymerization reaction.

The acceleration voltage for the electron rays preferably is from 100 kv to 500 kv, and more preferably from 100 kv to 300 kv. Also, the dosage of the electron rays is from 1.0 to 20 Mrad, and preferably from 2.0 to 10 Mrad. If the acceleration voltage is less than 100 kg, the energy is deficient and thus the hardening reaction of the magnetic layer does not sometimes proceed completely. If the acceleration voltage is over 500 kv, the applied energy becomes excessive to the energy consumed in the hardening reaction and produces bad effects on the magnetic layer and the non-magnetic support. Also, if the dosage is less than 1.0 Mrad, the hardening reaction proceeds insufficiently and the strength of the magnetic layer is insufficient, while if the dosage is over 20 Mrad, the energy efficiency is uneconomically reduced, the magnetic recording medium itself is heated, and the non-magnetizable support is sometimes deformed by the action of heat.

In this invention, it is preferred to apply the radiation irradiation after coating the coating composition for the magnetic layer and then applying thereto the calender treatment since in such a case, the magnetic layer can be kept at a soft state at the calender treatment, whereby the calendering property is good and after the calender treatment, the magnetic layer can be instantly hardened in a super smooth state. However, the calender treatment may be carried out after the irradiation. Still further, the irradiation may be applied before and after the calender treatment.

By employing the above (electron ray) irradiation step, the hardening step for the magnetic layer can be greatly shortened as compared with an ordinary heat-hardening treatment, and further the amount of solvent used in the magnetic coating composition can be greatly reduced. Thus, since the quality of the product is immediately stabilized after the production thereof, the products can be soon forwarded for their intended use.

As described above, after applying the desired treatments to the magnetic layer and the back layer of the magnetic recording medium, the coated product is cut into desired form, such as a tape, card, disc, sheet, etc., and according to the kind of the magnetic recording medium, the product, for example, can be placed in a cassette, which is then placed in a case. Still another means of employing the product is to attach it to a base material or laminate it with another material to provide practical final products.

In any case, the magnetic recording medium can be easily produced to provide desired products by utilizing or applying conventional techniques.

The invention is explained in more detail and more practically based on the following illustrative and non-limiting examples and comparison examples. In addition, "parts" therein are all by weight.

EXAMPLE 1

| Coating Composition | |
|---|---|
| Co—FeO$_x$ (x = 1.45) particles (Crystal size: 280 Å, BET specific area: 48 m$^2$/g) | 100 parts |
| Vinyl Chloride Copolymer Acrylate (Acid value: 3, Molecular weight: 20,000, Average content of acryloyl group: 2.8/molecule) | 10 parts |
| Polyurethane Acrylate (Acid value: 1.8, Molecular weight: 10,000, Average content of acryloyl group: 3/mole.) | 8 parts |
| Trimethylolpropane Triacrylate | 4 parts |
| Stearic Acid | 1.5 parts |
| Butyl stearate | 2 parts |
| α-Alumina (Average particle size: 0.2 μm) | 8 parts |
| Carbon Black (Oil absorption: 180 ml/100 g, Average particle size: 28 μm) | 1 part |
| Cyclohexanone | 250 parts |
| Methyl Ethyl Ketone | 150 parts |

The above composition was kneaded by a kneader, roughly dispersed by a stirrer, and further finely dispersed by a sand mill. The dispersion thus obtained was filtered using a filter having an average pore diameter of 1 μm to provide a coating composition for a magnetic layer.

The coating composition was coated on the surface of a polyethylene terephthalate support having a thickness of 15 μm and a surface roughness (Ra) of 8 nm, at a dry thickness of 3.5 μm, while running the support at a speed of 80 meters/min.

The coated support was subjected to a magnetic field orientation treatment by cobalt magnets (2,000 gauss) while the magnetic layer was in a wet state and after drying, was subjected to a calender treatment and an electron ray irradiation treatment followed by cutting in ½ inch width to provide a video tape for S-VHS.

In addition, the calender treatment was carried out using a three-stage metal rolls (Ra$_I$: 10 nm) at a roll temperature of 90° C. and a line pressure of 280 kg/cm.

Also, the glass transition Tg of the magnetic layer at the calender treatment was 0° C.

Also, the electron ray irradiation treatment was carried out at an acceleration voltage of 200 kv, a dosage of 5 Mrad, an environmental temperature for irradiation of 50° C., and an oxygen concentration of 10 ppm.

EXAMPLE 2

The same procedure as Example 1 was followed, except that the calender treatment was carried out by using the calender having the construction shown below to produce a video tape.

The calender was comprised of 7 stage rolls, the first 3 stage rolls were the same as the metal rolls used in Example 1, the 4th stage roll and the 6th stage roll were elastic rolls (the surfaces of the 4th and 6th stage rolls were composed of an epoxy resin containing an inorganic filler). The 5th stage roll and the 7th stage roll employed the same metal rolls as the 1st stage roll.

EXAMPLE 3

The same procedure as Example 2 was followed, except that the temperature for the calender treatment was changed to 60° C. to produce a video tape.

COMPARISON EXAMPLE 1

The same procedure as Example 2 was followed, except that an elastic roll was employed as the 2nd stage roll such that all the rolls were alternately composed of the rigid roll and the elastic roll, and the magnetic recording element was treated between the rigid roll and the elastic roll to produce a video tape.

EXAMPLE 4

| Coating Composition | |
|---|---|
| Co—FeO$_x$ ($x$ = 1.45) particles (Crystal size: 280 Å, BET surface area: 48 m$^2$/g) | 100 parts |
| Vinyl Chloride Copolymer MR-110*1 | 10 parts |
| Polyurethane Resin, N-2304*2 | 4 parts |
| Polyisocyanate Compound, Coronate L*3 | 8 parts |
| Oleic Acid | 0.5 part |
| Stearic Acid | 1 part |
| Butyl Stearate | 1.5 parts |
| Cr$_2$O$_3$ (Average particle size: 0.3 μm) | 8 parts |
| Carbon Black (oil absorption: 180 ml/100 g, Average particle diameter: 280 mμ) | 1 part |
| Cyclohexanone | 250 parts |
| Methyl Ethyl Ketone | 250 parts |

*1Trade name, made by Nippon Zeon K.K.
*2Trade name, made by Nippon Polyurethane K.K.
*3Trade name, made by Nippon Polyurethane K.K.

The above composition, omitting the polyisocyanate compound and oleic acid, was dispersed for 48 hours using a ball mill and after adding thereto the polyisocyanate compound and oleic acid, the mixture was further stirred. The composition was then filtered using a filter having an average pore diameter of 1 μm to provide a coating composition for a magnetic layer.

Then, the same procedure as in Example 1 was followed, except that the coating composition thus obtained was used to produce a video tape. In this case, however, the drying temperature of the coated layer was at most 110° C., and the glass transition point Tg of the magnetic layer before the calender treatment was 65° C.

EXAMPLE 5

The same procedure as Example 4 was followed, except that the drying temperature of the coated layer was at most 110° C. and the glass transition point of the magnetic layer before the calender treatment was 55° C. to produce a video tape.

EXAMPLE 6

The same procedure as Example 4 was followed, except that the drying temperature of the coated layer was at most 85° C. and the transition point Tg of the magnetic layer before the calender treatment was 40° C. to produce a video tape.

COMPARISON EXAMPLE 2

The same procedure as Example 5 was followed, except that the calender treatment was carried out by using the calender used in Comparison Example 1, to produce a video tape.

COMPARISON EXAMPLE 3

The same procedure as Example 1 was followed, except that the line pressure for the calender treatment was changed to 380 kg/cm to produce a video tape.

On each of the video tapes obtained in the examples and the comparison examples, the properties of the pores of the surface of the magnetic layer (the average value of pore inlet diameters, the half value width of the frequency distribution curve of the pore inlet diameters, and the most frequent value of the pore inlet diameters) and the characteristics of each video tape were measured and the results obtained are shown in Table 1 below.

The characteristics of the video tape were evaluated as follows.

Surface Roughness (RaI)

The center surface average roughness (RaI) at the whole measured points in dot number 256×256 and measured area of 0.256 mm$^2$ were measured by a light interference method using a digital optical profile meter, TOPO-3D, trade name, made by WYKO Co.

C/N

A signal of 6 MHz was recorded on each sample using a S-VHS video tape recorder (BR-7000, trade name, made by Victor Company of Japan, Limited), the noise generated in the range of 6±1 MHz in the case of reproducing the signal was measured, and the ratio of the reproduced signal to the noise was measured. The measurement was carried out using an output level meter of Type NV-870HD (trade name, made by Matsushita Electric Industrial Co., Ltd.). In addition, the values shown in Table 1 below are relative values in comparison to the C/N of the video tape obtained in Comparison Example 1 which was defined as 0 dB.

Still Life

The video signal of an image signal 50 IRE was recorded, the recorded signal was reproduced in a still mode and recorded by a reproduction RF output level recorder, and the time required for reducing the signal level to ½ was measured.

Kinematic Friction Coefficient

Each video tape was brought into contact with a stainless steel pole at a tension of 50 g (T1) and the tension ($T_2$) necessary for running the tape at a speed of 3.3 cm/second in this state was measured. From these measured values, the kinematic friction coefficient $\mu_1$ of the tape was calculated by the following equation;

$$\mu_1 = 1/\pi \cdot \ln(T_2/T_1).$$

Also, using each video tape after running 100 times using a S-VHS type video tape recorder, the kinetic friction coefficient $\mu_2$ was measured by the same manner as above.

The results of the evaluations thus obtained are shown in Table 1.

TABLE 1

| | Pore Property | | | | Video Tape Characteristics | | | |
|---|---|---|---|---|---|---|---|---|
| | Mean Value (Å) | Half Value Width (Å) | Most Frequent Value (Å) | Surface Roughness (nm) | C/N (dB) | Still Life (min.) | Kinematic Friction Coefficient | |
| | | | | | | | 1 pass | 100 passes |
| Example 1 | 30 | 40 | 25 | 2.9 | +1.8 | >60 | 0.26 | 0.27 |
| Example 2 | 40 | 50 | 30 | 2.5 | +2.7 | >60 | 0.28 | 0.26 |
| Example 3 | 40 | 35 | 35 | 3.4 | +2.0 | >60 | 0.27 | 0.28 |
| Example 4 | 50 | 30 | 45 | 4.4 | +0.9 | 50 | 0.25 | 0.34 |
| Example 5 | 40 | 40 | 35 | 3.9 | +1.5 | >60 | 0.26 | 0.29 |
| Example 6 | 35 | 40 | 30 | 3.0 | +1.9 | >60 | 0.27 | 0.29 |
| Comparison Example 1 | 75 | 25 | 75 | 4.6 | 0.0 | 30 | 0.29 | 0.41 |
| Comparison Example 2 | 110 | 55 | 90 | 5.3 | −1.0 | 50 | 0.22 | 0.38 |
| Comparison Example 3 | 25 | 20 | 25 | 2.8 | +2.0 | 50 | 0.28 | 0.35 |

(Note)
Average Value: Average value of pore inlet diameters.
Half Value Width: Half value width of the frequency distribution curve of pore inlet diameters.
Most Frequent Value: Most frequent value of pore inlet diameters in the distribution curve.

From the results shown in Table 1, it can be seen that the video tapes obtained in the examples of this invention are remarkably excellent in electromagnetic characteristics and running characteristics. That is, in the samples of this invention, C/N is very high, the still life is excellent, and the kinetic friction coefficient is very low even after 100 passes as compared to the comparison samples.

EXAMPLE 7

A coating composition for forming a magnetic layer shown below was coated on one surface of a polyethylene terephthalate film having a thickness of 15 μm and a surface roughness (Ra) (cutoff value 0.25 mm) of 0.008 μm. The coating composition was coated at a coating speed of 80 meters/min and after applying thereto a magnetic field orientation treatment using a cobalt magnet of 2,000 gauss while the magnetic layer was in a wet state, the coated film was passed through an atmosphere of 100° C. for one minute for drying to form a magnetic layer of 3.5 μm in thickness on the film.

| Coating Composition | |
|---|---|
| Co—FeO$_{1.45}$ particles (Crystal size: 280 Å, S$_{BET}$: 48 m$^2$/g, Coercive force Hc: 900 Oe) | 100 parts |
| Vinyl Chloride Copolymer Acrylate (Acid value: 3, Molecular weight: 20,000, Average content of acryloyl group: 2.8/molecule) | 10 parts |
| Urethane Acrylate (Acid value: 1.8, Molecular weight: 10,000, Average content of acryloyl group: 3/molecule) | 8 parts |
| Trimethylolpropane Triacrylate | 4 parts |
| Isotridecyl Stearate | 1 part |
| Butyl Stearate | 1 part |
| Oleic Acid | 1 part |
| α-Al$_2$O$_3$ Fine Particles (Average particle size: 0.2 μm) | 8 parts |
| Carbon Black (Average particle size: 30 mμ, oil absorption: 180 ml/100 g) | 1 part |
| Cyclohexanone | 250 parts |
| Methyl Ethyl Ketone | 150 parts |

The above composition was kneaded by a kneader, coarsely dispersed by a stirrer, and then finely dispersed by a sand mill. The dispersion was filtered by a filter having an average pore size of 1 μm to provide the magnetic coating composition.

After forming a magnetic layer as described, a calender treatment was applied to the coated film by a calender composed of 3 stage metal rolls (stainless steel rolls plated with hard chromium) at a roll temperature of 90° C. and a line pressure of 280 kg/cm (in this case, Tg of the magnetic layer was 0° C.), and further an electron ray irradiation treatment was applied thereto under the conditions of acceleration voltage of 200 kv, dosage of 5 Mrad, irradiation temperature of 50° C., and oxygen concentration of 10 ppm. The film having the magnetic layer obtained was cut into a tape of ½ inch in width to provide a video tape (Sample 1) for S-VHS.

EXAMPLE 8

The same procedure as in Example 7 was followed, except that the conditions for the calender treatment were changed as shown below to produce a video tape (Sample 2) for S-VHS. The calender used was composed of 7 stage rolls, wherein the first 3 stage rolls, the 5th roll, and the 7th roll were rigid metal rolls (having a center surface average roughness Ra1 of 10 nm) and the 4th roll and the 6th roll were elastic rolls having a surface composed of an epoxy resin containing an inorganic filler.

EXAMPLE 9

The same procedure as in Example 8 was followed, except that the temperature for the calender treatment was changed to 60° C. to produce a video tape (Sample 3) for S-VHS.

COMPARISON EXAMPLE 4

The same procedure as in Example 8 was followed, except that the calender was changed as shown below to produce a video tape (Sample 4) for S-VHS. The calender was composed of 7 stage rolls, wherein each off stage roll was a rigid metal roll (center surface average roughness RaI of 10 nm) and each even stage roll was an elastic roll.

EXAMPLE 10

The same procedure as in Example 7 was followed, except that stearyl isostearate (B) was used in place of isotridecyl stearate in the coating composition to produce a video tape (Sample 5) for S-VHS.

EXAMPLE 11

The same procedure as in Example 7 was followed, except that butyl stearate was omitted and 2 parts of isotridecyl stearate was added in the coating composition to produce a video tape (Sample 6) for S-VHS.

COMPARISON EXAMPLE 5

The same procedure as in Example 11 was followed, except that isoamyl stearate (molecular weight: 354, melting point: 10° C.) was used in place of isotridecyl stearate in the coating composition to produce a video tape (Sample 7) for S-VHS.

COMPARISON EXAMPLE 6

The same procedure as in Example 11 was followed, except that oleyl stearate (molecular weight: 534, melting point: 33° C.) was used in place of isotridecyl stearate in the coating composition to produce a video tape (Sample 13) for S-VHS.

EXAMPLES 12 to 14

The same procedure as in Example 7 was followed, except that the coating composition shown below was used and each drying condition for the coated layer was changed as shown below, to produce video tapes (Samples 8, 9, and 10) for S-VHS (Examples 12, 13 and 14, respectively).

| Coating Composition | |
|---|---|
| Co—FeO$_{1.43}$ particles (Crystal size: 280 Å, S$_{BET}$: 48 m$^2$/g, Coercive force Hc: 900 Os) | 100 parts |
| Vinyl Chloride Copolymer, MR-10[*1] | 10 parts |
| Polyurethane Resin, N-2304[*2] | 4 parts |
| Polyisocyanate Compound, Coronate L[*3] | 8 parts |
| Cr$_2$O$_3$ Fine Particles (Average particle size: 0.3 μm) | 8 parts |
| Oleyl oleate | 1.5 parts |
| Stearic Acid | 1 part |
| Butyl Stearate | 1 part |
| Carbon Black (Average particle size: 30 mμ, oil absorption 180 ml/100 g) | 1 part |
| Cyclohexanone | 250 parts |
| Methyl Ethyl Ketone | 250 parts |

[*1]Trade name, made by Nippon Zeon K.K.
[*2]Trade name, made by Nippon Polyurethane K.K.
[*3]Trade name, made by Nippon Polyurethane K.K.

The above composition, except the polyisocyanate compound and oleyl oleate, was kneaded in a ball mill and the polyisocyanate compound and oleyl oleate were added thereto. The mixture was stirred and the dispersion obtained was filtered using a filter having an average pore diameter of 1 μm to provide the coating composition.

The glass transition point Tg of the magnetic layer at the calender treatment by the change of the drying temperature of the magnetic layer was 56° C. for Sample 8, 55° C. for Sample 9, and 40° C. for Sample 10.

COMPARISON EXAMPLE 7

The same procedure as in Example 13 was followed, except that the calender treatment was carried out in the same manner as in Comparison Example 4, to produce a video tape (Sample 11) for S-VHS.

COMPARISON EXAMPLE 8

The same procedure as in Example 7 was followed, except that the conditions for the calender treatment were changed as follows to produce a video tape (Sample 12) for S-VHS. The calender treatment was carried out using metal rolls (RaI 10 nm.) and at a temperature of 90° C. and a line pressure of 380 kg/cm.

COMPARISON EXAMPLE 9

The same procedure as in Example 7 was followed, except that butyl stearate was used in place of isotridecyl stearate in the coating composition to produce a video tape (Sample 14) for S-VHS.

On each of the samples obtained, the pore property, center surface average roughness (RaI), C/N, still characteristics and kinematic friction coefficient (μ1, μ2) were measured in the same manner as described above and the results are shown in Table 2 below.

TABLE 2

| | | Pore Property | | | | Video Tape Characteristics | | | |
|---|---|---|---|---|---|---|---|---|---|
| | Sample No. | Average Value (Å) | Half Value Width (Å) | Most Frequent Value (Å) | Surface Roughness (nm) | C/N[*1] (dB) | Still Life (min.) | Kinematic Friction Coefficient | |
| | | | | | | | | 1 pass | 100 passes |
| Example 7 | 1 | 30 | 40 | 25 | 2.9 | +2.0 | >120 | 0.25 | 0.24 |
| Example 8 | 2 | 40 | 50 | 30 | 2.5 | +2.8 | >120 | 0.26 | 0.24 |
| Example 9 | 3 | 40 | 35 | 35 | 3.4 | +2.1 | >120 | 0.26 | 0.23 |
| Comparison Example 4 | 4 | 75 | 25 | 75 | 4.6 | 0.0 | 45 | 0.28 | 0.36 |
| Example 10 | 5 | 30 | 40 | 25 | 2.9 | +1.9 | >120 | 0.25 | 0.24 |
| Example 11 | 6 | 35 | 45 | 30 | 3.1 | +1.8 | >120 | 0.27 | 0.25 |
| Comparison Example 5 | 7 | 35 | 45 | 30 | 3.1 | +1.8 | 80 | 0.29 | 0.38 |
| Example 12 | 8 | 50 | 30 | 45 | 4.4 | +0.9 | 100 | 0.25 | 0.31 |
| Example 13 | 9 | 40 | 40 | 35 | 3.9 | +1.5 | >120 | 0.26 | 0.27 |
| Example 14 | 10 | 35 | 40 | 30 | 3.0 | +2.0 | >120 | 0.27 | 0.27 |

TABLE 2-continued

| | | Pore Property | | | | Video Tape Characteristics | | |
|---|---|---|---|---|---|---|---|---|
| | Sample No. | Average Value (Å) | Half Value Width (Å) | Most Frequent Value (Å) | Surface Roughness (nm) | C/N*1 (dB) | Still Life (min.) | Kinematic Friction Coefficient | |
| | | | | | | | | 1 pass | 100 passes |
| Comparison Example 7 | 11 | 110 | 55 | 90 | 5.3 | −1.3 | 100 | 0.24 | 0.30 |
| Comparison Example 8 | 12 | 25 | 20 | 25 | 2.8 | +2.0 | 90 | 0.29 | 0.30*2 |
| Comparison Example 6 | 13 | 35 | 45 | 30 | 3.0 | *3 | *3 | *3 | *3 |
| Comparison Example 9 | 14 | 30 | 40 | 25 | 2.8 | +1.9 | 100 | 0.28 | 0.32 |

(Note)
Average Value: Average value of pore inlet diameters.
Half Value Width: Half value width of the frequency distribution curve of pore inlet diameters.
Most Frequent Value: Most frequent value of pore inlet diameters in the distribution curve.

From the results shown in Table 2, it can be seen that the magnetic recording tapes in the examples of this invention are excellent in C/N, and in the values of still reproduction and the kinematic friction coefficient after 100 passes, and are also excellent in electromagnetic characteristics and running durability. That is, the samples of this invention are magnetic recording tapes with balanced characteristics. On the other hand, the sample tape in Comparison Example 4 has pore inlet diameters corresponding to those of the magnetic tapes disclosed in U.S. Pat. No. 4,759,954 and is inferior to the samples of this invention in the points of C/N and the still reproduction.

EXAMPLE 15

| Coating Composition | |
|---|---|
| Co—FeO$_{1.45}$ particles (Crystal size: 280 Å, BET surface area: 48 m$^2$/g) | 100 parts |
| Vinyl Chloride polymer Acrylate (Acid value: 3, Molecular weight: 20,000, Average content of acryloyl group: 2.8/molecule) | 10 parts |
| Polyurethane Acrylate (Acid value: 1.8, Molecular weight: 10,000, Average content of acryloyl group: 3/molecule) | 8 parts |
| Trimethylolpropane Triacrylate | 4 parts |
| Butyl stearate | 2 parts |
| α-Alumina (Average particle size: 0.2 μm) | 8 parts |
| Carbon Black (oil absorption: 180 ml/100 g, Average particle size: 28 μm) | 1 part |
| Cyclohexanone | 250 parts |
| Methyl Ethyl Ketone | 150 parts |

The above composition, omitting trimethylolpropane triacrylate and butyl stearate, and with a part of cyclohexanone and a part of methyl ethyl ketone was kneaded by a kneader and roughly dispersed by a stirrer. Then, the remaining components were added to the mixture, the mixture was finely dispersed by a sand mill, and after adding thereto 1.0 part of stearic acid, 0.5 part of oleic acid, and 0.5 part of behenic acid, the resultant mixture was dispersed again. The dispersion thus obtained was filtered using a filter having an average pore diameter of 1 μm to provide a coating composition for a magnetic layer.

The coating composition thus obtained was coated on a polyethylene terephthalate film supported having a thickness of 15 μm and a surface roughness Ra of 8 nm, at a dry thickness of 3.5 μm, while running the support at a speed of 80 meters/min. to form a magnetic layer. The magnetic layer formed on the non-magnetizable support was subjected to a field orientation treatment by a cobalt magnet (2,000 gauss) while the magnetic layer is in a wet state and after drying, was subjected to a calender treatment and an electron ray irradiation treatment. The magnetic recording medium obtained was cut into a width of ½ inch to provide a video tape for S-VHS.

In addition, the calender treatment was carried out using three stage metal rolls (RaI: 10 nm) at a roll temperature of 90° C. and a line pressure of 280 kg/cm. The glass transition point Tg of the magnetic layer at the calender treatment was 0° C.

Also, the electron ray irradiation treatment was carried out at an acceleration voltage of 200 kv, a dosage of 5 Mrad, an irradiation environmental temperature of 50° C., and at an oxygen concentration of 10 ppm.

EXAMPLE 16

The same procedure as Example 15 was followed, except that the calender treatment was carried out using the calender having the following constitution to produce a video tape.

The calender was composed of 7 stage rolls, wherein the first 3 rolls were the same as the metal rolls used in Example 15, the 4th roll and the 6th roll were elastic rolls (the surface of each of the 4th and 6th rolls was composed of an epoxy resin containing an inorganic filler) and the 5th roll and the 7th roll were same as the 1st metal roll.

EXAMPLE 17

The same procedure as in Example 16 was followed, except that the temperature for the calender treatment was changed to 60° C., to produce a video tape.

COMPARISON EXAMPLE 10

The same procedure as in Example 16 was followed, except that the 2nd roll is changed to an elastic roll so that all the rolls are alternately comprised of the rigid metal roll and the elastic roll, and the magnetic recording medium was treated between the rigid metal roll and the elastic roll to produce a video tape.

EXAMPLE 18

| Coating Composition | |
|---|---|
| Co—FeO$_{1.45}$ particles (Crystal | 100 parts |

-continued

| Coating Composition | |
|---|---|
| size: 280 Å, BET specific surface area: 48 m²/g) | |
| Vinyl Chloride Polymer ("MR-110", produced by Nippon Zeon Co., Ltd.) | 10 parts |
| Polyurethane Resin ("N-2304", produced by Nippon Polyurethane Co., Ltd.) | 4 parts |
| Polyisocyanate Compound ("Coronate L", produced by Nippon Polyurethane Co., Ltd.) | 8 parts |
| Myristic Acid | 0.5 part |
| Oleic Acid | 0.8 part |
| Stearic Acid | 1 part |
| Butyl Stearate | 1.5 parts |
| Stearic Acid Amide | 0.2 part |
| $Cr_2O_3$ (Average particle size 0.3 μm) | 8 parts |
| Carbon Black (oil absorbance: 180 ml/100 g, Average grain size: 28 mμ) | 1 part |
| Cyclohexanone | 250 parts |
| Methyl Ethyl Ketone | 250 parts |

The above composition, omitting the polyisocyanate compound, oleic acid, and stearic acid, was dispersed for 48 hours using a ball mill and after adding thereto the polyisocyanate compound, oleic acid, and stearic acid, the resultant mixture was filtered using a filter having an average pore diameter of 1 μm to provide a coating composition.

Then, the same procedure as in Example 15 was followed, except that the coating composition obtained as above was used to produce a video tape.

In this case, the highest temperature of drying of the coated magnetic layer was 110° C. and the glass transition point of the magnetic layer before the calender treatment was 65° C.

EXAMPLE 19

The same procedure as Example 18 was followed, except that the highest drying temperature for the coated magnetic layer was 100° C. and the glass transition point of the magnetic layer before the calender treatment was changed to 55° C. to produce a video tape.

coated magnetic layer was changed to 85° C. and the glass transition point Tg of the magnetic layer before the calender treatment was changed to 40° C. to produce a video tape.

COMPARISON EXAMPLE 11

The same procedure as Example 19 was followed, except that the calender treatment was carried out using the calender used in Comparison Example 10 to produce a video tape.

COMPARISON EXAMPLE 12

The same procedure as Example 15 was followed, except that the line pressure in the calender treatment was changed to 380 kg/cm to produce a video tape.

COMPARISON EXAMPLE 13

The same procedure as Example 15 was followed, except that the addition time of stearic acid, oleic acid, and behenic acid was changed to the time for the coarse dispersion of the composition to produce a video tape.

The characteristics of each of the video tapes thus produced were evaluated as follows.

The center surface average roughness (RaI), C/N, the Still life, and the kinematic friction coefficient were evaluated by the same manner as described above.

Blooming

The surface of the sample tape was observed by an optical microscope of 250 magnification.

Contact Noise

Each sample tape was runn 10 times for 2 minutes using a deck, NV-M21 (trade name, made by Matsushita Electric Industrial Co., Ltd.) at 23° C. and 10% RH, a Y signal output was subjected to FFT processing up to 1.2 to 4.5 MHz by a spectrum analyzer, HP-3585A, and the peak spectrum of the noise spectra was measured.

The difference between the maximum noise output of the noise spectra at the first running and the maximum noise output at the 10th running is defined as contact noise.

TABLE 3

| | Pore Property | | | | | Video Tape Characteristics | | | | | |
|---|---|---|---|---|---|---|---|---|---|---|---|
| | Average Value (Å) | Half Value Width (Å) | Most Frequent Value (Å) | Surface Roughness (nm) | Amount of Free Fatty Acid (mg) | C/N (dB) | Still Life (min.) | Kinematic Friction | | Contact Noise (dB) | Blooming |
| | | | | | | | | 1 pass | 100 passes | | |
| Example 15 | 30 | 40 | 25 | 2.9 | 7.5 | +1.9 | >60 | 0.27 | 0.27 | 2 | None |
| Example 16 | 40 | 50 | 30 | 2.5 | 6.3 | +2.7 | " | 0.28 | 0.26 | 2 | " |
| Example 17 | 40 | 35 | 35 | 3.4 | 5.0 | +2.0 | " | 0.27 | 0.28 | 3 | " |
| Example 18 | 50 | 30 | 45 | 4.4 | 12.0 | +1.0 | 50 | 0.26 | 0.33 | 2 | " |
| Example 19 | 40 | 40 | 35 | 3.9 | 13.1 | +1.5 | >60 | 0.27 | 0.29 | 2 | " |
| Example 20 | 35 | 40 | 30 | 3.0 | 15.0 | +1.9 | " | 0.28 | 0.29 | 2 | " |
| Comparison Example 10 | 75 | 25 | 75 | 4.6 | 11.3 | 0.0 | 30 | 0.29 | 0.41 | 3 | " |
| Comparison Example 11 | 110 | 55 | 90 | 5.3 | 20.2 | −1.1 | 50 | 0.23 | 0.38 | 2 | Occurred |
| Comparison Example 12 | 25 | 20 | 25 | 2.8 | 5.1 | +1.9 | 50 | 0.28 | 0.35 | 4 | None |
| Comparison Example 13 | 30 | 40 | 25 | 2.9 | 3.1 | +1.8 | >60 | 0.26 | 0.27 | 6 | " |

(Note)
Average Value: Average value of pore inlet diameters.
Half Value Width: Half value width of the frequency distribution curve of pore inlet diameters.
Most Frequent Value: Most frequent value of pore inlet diameters in the distribution curve.

EXAMPLE 20

The same procedure as Example 18 was followed, except that the highest drying temperature for the As is clear from the results shown in Table 3, it can be seen that the video tapes of this invention obtained in the above examples have very high C/N, excellent still life and contact noise, very low kinematic friction coefficient at 100 passes, and very excellent electromagnetic characteristics and running property as compared with the samples in the comparison examples.

As described above, the magnetic recording media of this invention have pores at the surface of the magnetic layer which have the specific properties as described above, and hence are very excellent in electromagnetic characteristics at short wavelength recording at shorter than 1 μm in wavelength and also very excellent in running stability and running durability. Thus, the magnetic recording media of this invention shown very excellent balance of electromagnetic conversion characteristic and running properties.

Also, in the preferred embodiment of this invention, high C/N is obtained by the magnetic layer having the super smooth layer, and at the same time the ester lubricant contained in the pores of the magnetic layer properly oozes to provide very good running durability even when there is a large contact area of the magnetic layer with a magnetic head, a head cylinder, and guide poles, and under high humidity and high load.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having formed thereon a magnetic layer containing ferromagnetic particles dispersed in a binder, wherein the surface of the magnetic layer has pores of (a) at most 50 Å in the average value of pore inlet diameters measured by a nitrogen gas adsorption method and (b) at least 25 Å in the half value width of the frequency distribution curve of the pore inlet diameters.

2. The magnetic recording medium as claimed in claim 1, wherein the ferromagnetic particles present in the magnetic layer have a specific area by a BET method of at least 35 $m^2/g$ and a crystal size of not larger than 300 Å.

3. The magnetic recording medium as claimed in claim 1, wherein the magnetic layer has a center surface average roughness (RaI) of less than about 5 nm.

4. The magnetic recording medium as claimed in claim 1, wherein the magnetic layer is subjected to a calender roll treatment by at least a pair of rigid metal rolls during the production of the magnetic recording medium.

5. The magnetic recording as claimed in claim 4, wherein the rigid rolls have a center surface average roughness (RaI) of less than about 20 nm.

6. The magnetic recording medium as claimed in claim 4, wherein the calender treatment is applied at a line pressure of from 50 to 350 kg/cm and a temperature of from 50 to 110° C.

7. The magnetic recording medium as claimed in claim 4, wherein the glass transition point Tg of the magnetic layer before the calender treatment is at least 30° C. higher than the temperature for the calender treatment.

8. The magnetic recording medium as claimed in claim 4, wherein the glass transition point Tg of the magnetic layer before the calender treatment is at least 50° C. higher than the temperature for the calender treatment.

9. The magnetic recording medium as claimed in claim 1, wherein the binder of the magnetic layer contains a material capable of being crosslinked or polymerized by ionizing radiation.

10. The magnetic recording medium as claimed in claim 9, wherein the magnetic layer is, after the calender treatment, subjected to an ionizing radiation treatment.

11. The magnetic recording medium as claimed in claim 10, wherein the radiations are electron rays.

12. The magnetic recording medium as claimed in claim 1, wherein the pores of the surface of the magnetic layer contain an ester having a molecular weight of from 400 to 550 and being in liquid state at 25° C.

13. The magnetic recording medium as claimed in claim 1, wherein the pores of the surface of the magnetic layer contain a fatty acid in an amount that the extracting amount of the fatty acid from the surface of the magnetic layer by n-hexane is from 5 to 15 $mg/m^2$ area of the magnetic layer surface.

* * * * *